United States Patent [19]
Byren et al.

[11] Patent Number: 6,055,260
[45] Date of Patent: Apr. 25, 2000

[54] LASER PUMP CAVITY APPARATUS WITH INTEGRAL CONCENTRATOR AND METHOD

[75] Inventors: Robert W. Byren, Hermosa Beach, Calif.; Julie L. Bentley, Webster, N.Y.; Robin A. Reeder, El Segundo, Calif.

[73] Assignee: Raytheon Company, Lexington, Mass.

[21] Appl. No.: 08/994,796

[22] Filed: Dec. 19, 1997

[51] Int. Cl.⁷ .................................................. H01S 3/0941
[52] U.S. Cl. ............................................... 372/72; 372/75
[58] Field of Search .................................. 372/70, 72, 75

[56] References Cited

U.S. PATENT DOCUMENTS

| 5,307,365 | 4/1994 | Stappaerts et al. | 372/72 |
| 5,349,600 | 9/1994 | Shinbori et al. | |
| 5,581,573 | 12/1996 | Tanuma | 372/72 |
| 5,590,147 | 12/1996 | Hobbs et al. | 372/75 |
| 5,761,233 | 6/1998 | Bruesselbach et al. | 372/72 |

FOREIGN PATENT DOCUMENTS 0801499  10/1997  European Pat. Off. .

OTHER PUBLICATIONS

Jackson, Stuart D. and Piper, James A., "Encapsulated rod for efficient thermal management in diode–side–pumped Nd:YAG lasers", Applied Optics, vol. 35, No. 15, May 20, 1996.

Primary Examiner—James W. Davie
Attorney, Agent, or Firm—Colin M. Raufer; Leonard A. Alkov; Glenn H. Lenzen, Jr.

[57] ABSTRACT

A laser pump cavity apparatus with integral concentrator provides uniform gain and high absorption efficiency. The apparatus has a doped solid-state laser medium, a concentrator which has a top cladding layer formed on the top surface of the doped laser medium having a cylindrical focusing surface, a bottom cladding layer formed on the bottom surface of the doped laser crystal having a cylindrical focusing surface, and edge cladding layers formed on the side surfaces of the doped laser medium. Cold plates, each of which also preferably has one cylindrical surface of substantially identical shape, are placed in thermal contact with the cylindrical focusing surfaces of the top and bottom cladding layers to absorb heat. The cylindrical focusing surfaces preferably have hyperbolic or quasi-hyperbolic shape. The laser pump cavity apparatus is preferably edge-pumped with several laser diode arrays focused toward the line foci of the cylindrical focusing surfaces in directions transverse to a laser beam axis.

13 Claims, 4 Drawing Sheets

LASER PUMP CAVITY APPARATUS WITH INTEGRAL CONCENTRATOR AND METHOD

This application is related to applications filed on the same date herein entitled *Laser Pump Cavity Apparatus With Improved Thermal Lensing Control, Cooling, And Fracture Strength And Method* U.S. Pat. No. 5,974,061, and *Thermally Improved Slab Pump Cavity Apparatus With Integral Concentrator,* U.S. Pat. No. 6,014,391, the disclosures of which are hereby incorporated fully herein.

TECHNICAL FIELD

The present invention relates generally to the field of lasers. In particular, this invention relates to slab laser pumphead with integral pumplight concentrator.

BACKGROUND

Conventional moderate-to-high power diode-pumped lasers that use a high aspect ratio rectangular slab geometry for the active lasing medium are either end pumped, in which the pumplight traverses the slab in the same direction as the laser beam, or face pumped, in which the pumplight enters the slab through the largest face and traverses the thin dimension of the slab transverse to the beam axis. The performance of end-pumped slab lasers is limited in high power applications by the need to focus or concentrate all of the pumplight through the relatively small ends of the slab, thereby requiring high damage threshold dichroic coatings, high brightness diode arrays, and many slab segments. The design of face-pumped slab lasers for continuous lasing applications is complicated by the need to pump and cool the slab through the same large face. The aforementioned limitations of end pumping and inherent complexity of face pumping can be alleviated by transversely pumping the slab through its thin edges and cooling it through the large faces. The performance of such a simple edge pumped slab laser is limited, however, by higher absorption of the pumplight near the pumped edges of the slab and lower absorption near the center of the slab, resulting in severe gain nonuniformity. The gain nonuniformity produces highly nonuniform near-field beam profiles, high diffraction loss at beam clippers, poor far-field beam quality, gain steering of the beam, and possible optical damage due to amplification of diffraction spikes near the edge of the slab.

Some previous attempts at improving gain uniformity by reducing the doping concentration resulted in reduced pumping efficiency, as less of the pumplight was absorbed in a single pass through the slab.

Several related pump cavity designs have been proposed which provide efficient and uniform side-pumping of a laser rod or low-aspect laser slab by allowing the pumplight to traverse the laser medium in several passes, with relatively low absorption per pass. These approaches, however, are not directly applicable to high-aspect slab laser media used in moderate-to-high power applications.

SUMMARY

The present invention relates to an apparatus and method of using an integrating laser pump cavity concept in a slab laser pump cavity apparatus with an integral concentrator. In integrating laser pump cavities the pumplight is reflected more than once and they have superimposed pump absorption during several passes through the slab.

The method of the invention includes injecting pumplight from the edge, generally toward the foci of the hyperbolic surfaces. Pumplight is concentrated as it nears the center of the slab. Therefore, the loss in pump power due to absorption is approximately offset by the higher concentration of rays of pumplight near the center of the slab. Preferably, the method includes the following steps: forming a concentrator around a doped laser crystal by diffusion bonding to make, a top cladding layer with a cylindrical focusing surface; placing a first cooling means above the top cladding layer and placing a second cooling means below cladding layer; and injecting pumplight from laser diode arrays through the edge of the composite slab in directions toward the line foci of the cylindrical surfaces.

Another aspect of the present invention is a laser pump cavity apparatus with integral concentrator which provides uniform gain and high absorption efficiency. The apparatus preferably has a doped solid state active lasing region (crystal or glass), a concentrator having at least a top cladding layer formed on a top surface of the doped solid state active lasing region and having a substantially cylindrical concave outer focusing surface. Each cylindrical focusing surface preferably has hyperbolic or quasi-hyperbolic shape and defines a respective optical line focus, with one optical line focus preferably being located above and the other below the laser pump cavity apparatus. An edge cladding layer may be formed on the edge surfaces of the doped solid-state laser material, preferably prior to adding the top and bottom cladding layers, to improve the optical performance of the concentrator. The cylindrical focusing surfaces may be in thermal contact with a pair of cold plates to absorb heat from the two major faces of the slab-like lasing region. The concentrator is preferably formed by diffusion bonding undoped host crystal cladding layers on top and bottom faces and outside edges of a slab-shaped doped laser crystal which is an active lasing region and has outer cylindrical optical focusing surfaces on its top and bottom cladding layers. The cylindrical focusing surfaces of the top and bottom cladding layers of the concentrator preferably have hyperbolic or quasi-hyperbolic cylindrical shape, but can also be of a different cylindrical shape, like ellipse, parabola and circle, and these surfaces can also be tapered along the laser beam axis direction. Pumplight focused at one of the line foci, is reflected by the non-corresponding cylindrical surface toward the other line focus, and this reflecting process is repeated with each cylindrical surface, thus trapping the pumplight within the laser pump cavity until it is substantially absorbed. The cylindrical focusing surfaces are coated to ensure high reflectivity at the pump wavelength, and the entrance surfaces of the laser pump cavity are coated with material which has antireflection properties.

The integrating slab laser pump cavity apparatus is preferably edge-pumped with laser diode arrays in directions transverse to a laser beam axis. Each laser diode array has integral cylindrical microlenses which form a collimated pumplight from each laser diode array in a predetermined direction, and a large cylindrical lens or lens group which focuses the collimated pumplight from each laser diode array to be refracted at the corresponding entrance surface of the laser pump cavity apparatus, and to be concentrated by the cylindrical focusing surfaces so that the pumplight, depleted by absorption in the solid-state active lasing region, is efficiently and uniformly absorbed across the width of the slab-like lasing region.

In one specific embodiment of the laser pump cavity apparatus, the cladding layers of the concentrator are manufactured by diffusion bonding of a crystal or glass doped with an ion that absorbs at the lasing wavelength, yet is highly transmissive at the pump wavelength to improve absorption efficiency by reducing parasitic lasing and suppress amplified spontaneous emission losses. The cladding layers of the concentrator may be a $U^{4+}$ doped yttrium aluminum garnet (YAG) crystal, which will transmit at the pump wavelength of 941 nm for a yttrium doped YAG laser (Yb:YAG) and absorb at the lasing wavelength of Yb:YAG of 1029 nm.

In another aspect of the present invention, absorbed pumplight is distributed toward the center of the laser pump cavity apparatus by undershooting the line foci. This is accomplished by placing a line focus of each laser diode array in a region of the laser pump cavity apparatus located between the cylindrical focusing surface and the line focus of that cylindrical focusing surface.

Yet another specific embodiment is a laser pump cavity apparatus wherein each entrance surface has two touching, slanted planes forming an angle between them, each plane nearly normal to the corresponding laser diode array to maximize transmission and avoid critical angle limitations in implementations requiring low f/number pumping.

The foregoing and additional features and advantages of this invention will become further apparent from the detailed description and accompanying drawing figures that follow. In the figures and written description, numerals indicate the various features of the invention, like numerals referring to like features, throughout for the drawing figures and the written description.

DETAILED DESCRIPTION OF THE INVENTION

Figure 1:
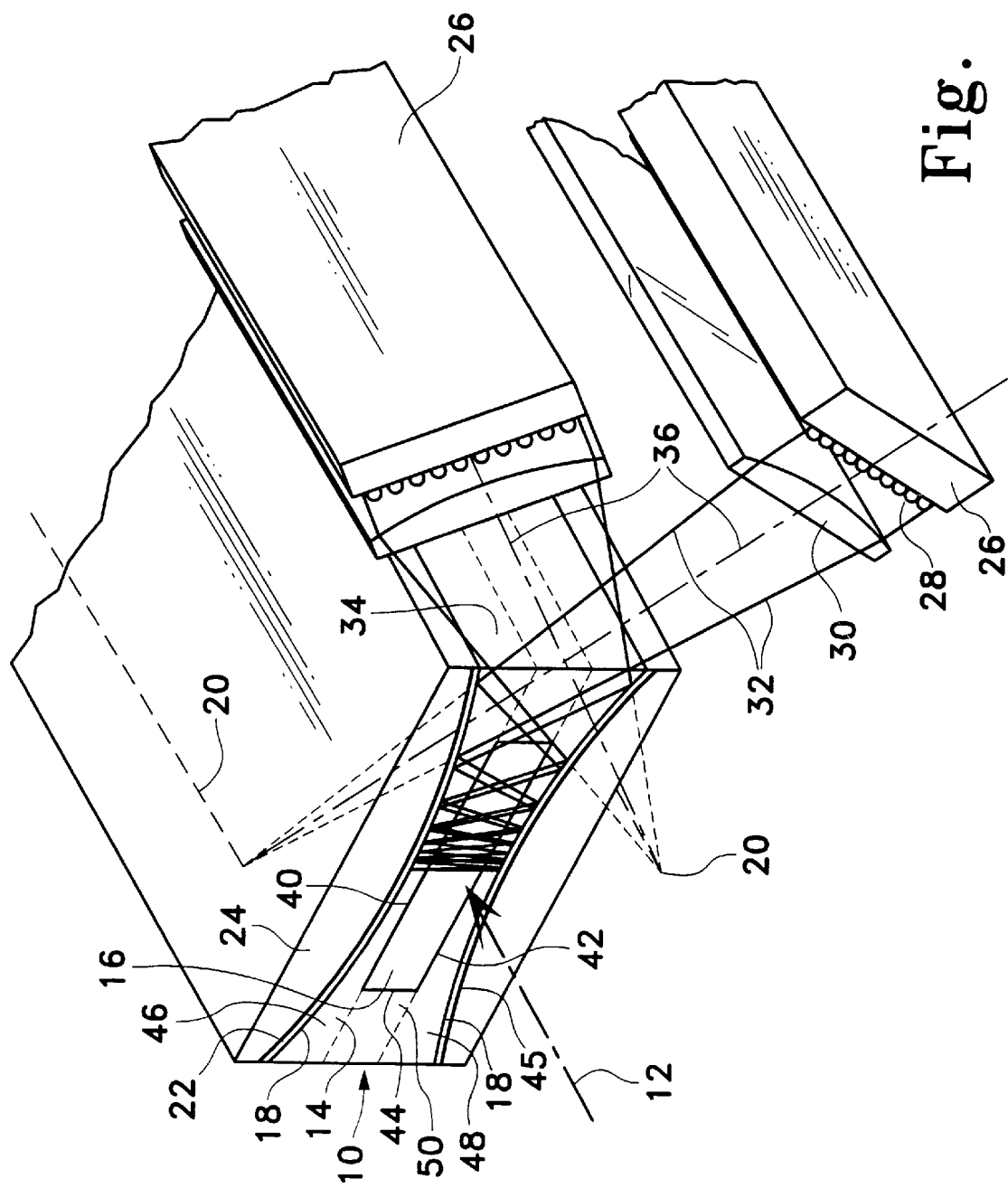
FIG. 1 is a schematic illustration showing an isometric view of one preferred embodiment of a slab laser pump cavity apparatus with an integral concentrator. Laser diode arrays and rays of pumplight at the left side of the pump cavity are not shown in order to preserve clarity.

FIG. 1 is a schematic illustration showing an isometric view of a preferred embodiment of a slab laser pump cavity apparatus with an integral concentrator. This embodiment consists of an edge-pumped configuration which employs a slab-shaped laser pump cavity 10 preferably constructed by diffusion bonding an undoped cladding layer 14 of laser host crystal, such as undoped YAG, around a doped laser crystal active lasing region 16, made of high-aspect ratio slab of similar type, such as YAG, which has been doped with an active ion, such as ytterbium. The undoped cladding layer 14 has a top cladding layer 46 with a concave, upwardly facing outer cylindrical focusing surface 18, a bottom cladding layer 48 having a concave, downwardly facing outer cylindrical focusing surface 18 and a pair of edge cladding layers 50. The active lasing region 16 preferably has a rectangular cross-section and is pumped by laser diode arrays 26 in directions transverse to the laser beam axis 12. Diffusion bonding is well known in the industry. It produces a bond that is as strong as the host crystal and which provides a good optical, mechanical and thermal interface. The disclosed invention preferably uses pumping in directions transverse to the laser beam axis 12, i.e., edge-pumping or side-pumping, although it could also be used with other pumping methods. Edge-pumping implies that pumping is accomplished from a narrow side (edge) of the slab, and not from a wide face of a slab, such as a top or bottom side.

The outer cylindrical focusing surfaces 18 on the top and bottom cladding layers 46, 48 of the undoped cladding layer 14 are preferably aligned longitudinally with the laser axis 12 and designed with a concave hyperboloid or near-hyperboloid cylindrical shape to more uniformly distribute the transverse pump light within the active region 16. Each cylindrical focusing surface 18 has its optical line focus 20 outside the laser pump cavity 10, as shown in FIG. 1, one above and the other belong the laser pump cavity 10. The cylindrical focusing surfaces 18 are preferably coated to ensure high reflectivity at the pump wavelength. The outer cylindrical focusing surfaces 18 are preferably covered with a compliant thermal interface material 22 and each cold plate 24 preferably has a cylindrical 45 surface placed adjacent to the thermal interface 22, which closely conforms to the shape of the cylindrical focusing surface 18, thereby facilitating thermal flow from the active region 15 to the cold plates 24. Heat is extracted from the doped laser crystal slab active lasing region 16 by conduction through the undoped cladding layer 14 and through the thermal interface 22 to the cold plate 24. The thermal interface 22 is preferably made of gold or indium metal foil and the cold plate 24 of an aluminum or copper alloy.

The pumplight is emitted by the laser diode arrays 26, available commercially, which preferably have integral cylindrical microlenses 28 that act to collimate the pumplight from each diode bar in a direction normal to the emitting surface. The collimated pumplight from each laser diode array 26 is then focused by a large cylindrical lens 30 so that the converging rays of pumplight 32, after being refracted at an entrance surface of the pump cavity 34, are directed toward the line foci of the cylindrical focusing surfaces 20. The entrance surface of the laser pump cavity 34 is coated with material which has antireflection properties at the pump wavelength, for the predetermined range of incidence angles, to maximize transmission of the pumplight into the laser pump cavity 10.

In the illustrative embodiment, principal rays of pumplight 32, which are focused at one of the line foci of cylindrical focusing surfaces 20, are reflected, by the non-corresponding cylindrical focusing surface 18, toward the other line focus 20, and this reflecting process is repeated with both cylindrical focusing surfaces 18, thus trapping substantially all of the pumplight within the laser pump cavity 10 until it is substantially absorbed. Although paraxial rays are not perfectly trapped, the absorption efficiency for paraxial rays over the total path length is high. The overall pumping efficiency of the laser pump cavity 10 is therefore very high, and depends on the absorption of the undoped cladding layer 14, the quality of the high reflectivity coatings on the cylindrical focusing surfaces 18, and the quality of the antireflection coatings at the entrance surfaces of the pump cavity 34.

In another aspect of the invention, the absorption efficiency may be further improved by reducing parasitic lasing and amplified spontaneous emission losses, which may be suppressed by doping the undoped cladding layers 14 with an ion that absorbs at the lasing wavelength, yet is highly transmissive at the pump wavelength. For example, $U^{4+}$ doped YAG crystal will transmit at the pump wavelength of the Yb:YAG laser (941 nm) and absorb at the lasing wavelength (1029 nm).

Figure 2:
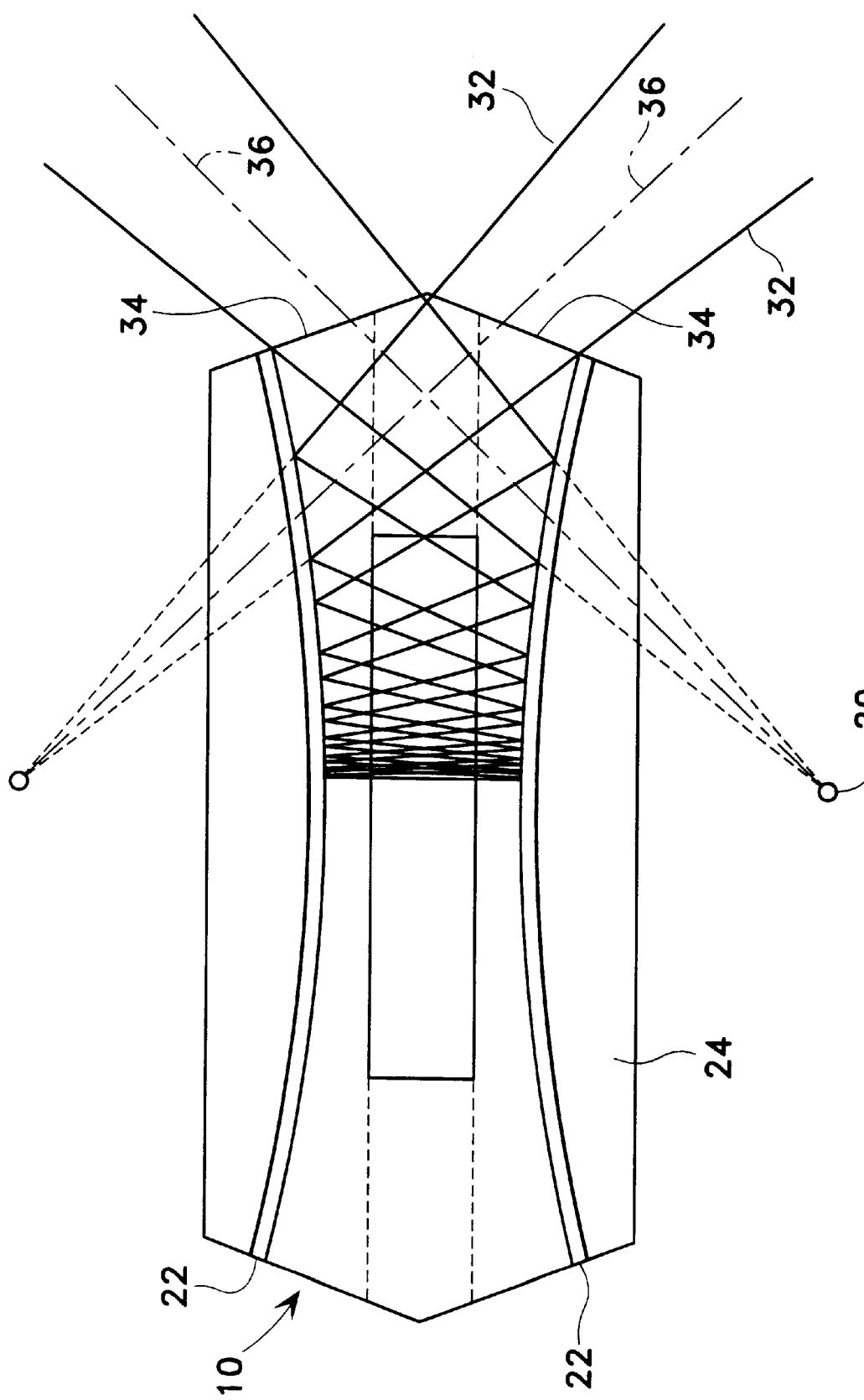
FIG. 2 is a plan view schematic illustration of a slab laser pump cavity apparatus with an integral concentrator designed for low f/number pumping, in accordance with another embodiment of the present invention.

For implementations requiring low f/number pumping, it may be advantageous to shape and/or coat the entrance surface(s) at the side edges of the pump cavity 34 to maximize transmission and avoid critical angle limitations. FIG. 2 is a plan view schematic illustration of a slab laser pump cavity apparatus with an integral concentrator designed for low f/number pumping, in accordance with another embodiment of the present invention. This embodiment, instead of one entrance surface of the pump cavity 34 on each side, has two touching, slanted entrance surfaces of the pump cavity 34 on each side. The precise angle of the entrance surface of the pump cavity 34 is selected according to the application and is based on a tradeoff between pumping efficiency and suppression of lateral parasitic lasing modes. The lateral parasitic lasing modes can reduce the stored energy in a Q-switched application or compete with the desired lasing process along the laser beam axis 12 in continuous or long-pulse applications.

The disclosed embodiment has been optimized through computer simulation, which shows the following advantages of the design: the absorption efficiency of the slab pump cavity 10 is high for a very wide range of slab configurations, doping concentrations, and pumping parameters; the large scale pumping uniformity (low spatial frequency) and attendant gain uniformity is influenced primarily by the alignment of the line foci of the laser diode array 38 (shown in FIG. 3 as LF'), relative to the line foci of the cylindrical focusing surfaces 20 (LF) and by slightly undershooting or overshooting the line foci 20; the higher order pumping profile (higher spatial frequency) in both the vertical and horizontal directions is also influenced by the alignment of the line foci of the laser diode array pump LF' 38 relative to the line foci of the cylindrical focusing surfaces 20; and the fact that, for a well designed pump cavity 10, the absorption efficiency and pumping uniformity are not strongly influenced by the doping concentration in the active region of the doped laser crystal 16.

The designer can shift the distribution of absorbed pumplight toward the center of the slab by undershooting the line foci 20, which is accomplished by placing the line foci of the laser diode array pump LF' 38 in the region between the cylindrical focusing surface 18 and the corresponding line foci 20 of that cylindrical focusing surface 18. By overshooting the line foci 20, the designer can shift the distribution of absorbed pumplight toward the edges of the slab.

In the higher order pumping profile (higher spatial frequency), the designer of the slab pump cavity 10 can minimize the high order spatial effects by varying the aspect ratio of the slab, the width of the undoped cladding layer 14 between the active region of doped laser crystal 16 and the entrance surface of the pump cavity 34, the point at which the converging rays of pumplight 32 are focused relative to the line foci of the cylindrical focusing surfaces 20, the speed of the large cylindrical lens 30, and the specific shape of the cylindrical focusing surfaces 18, which can be represented by a base radius of curvature (r) and a conic constant (k).

The fact that, for a well designed pump cavity 10, the absorption efficiency and pumping uniformity are not strongly influenced by the doping concentration in the active region of the doped laser crystal 16 is important for a quasi-four level laser system, such as Yb:YAG, because the laser designer would like to set the doping concentration to provide the highest lasing efficiency. Setting the doping concentration too low dictates a long gain length and linear absorption in the crystal becomes a problem. Setting the doping concentration too high requires additional pump power to maintain the same population inversion for efficient lasing. Increasing the pump power also increases the thermal loading of the crystal, which may bring a stress-induced fracture.

Figure 3:
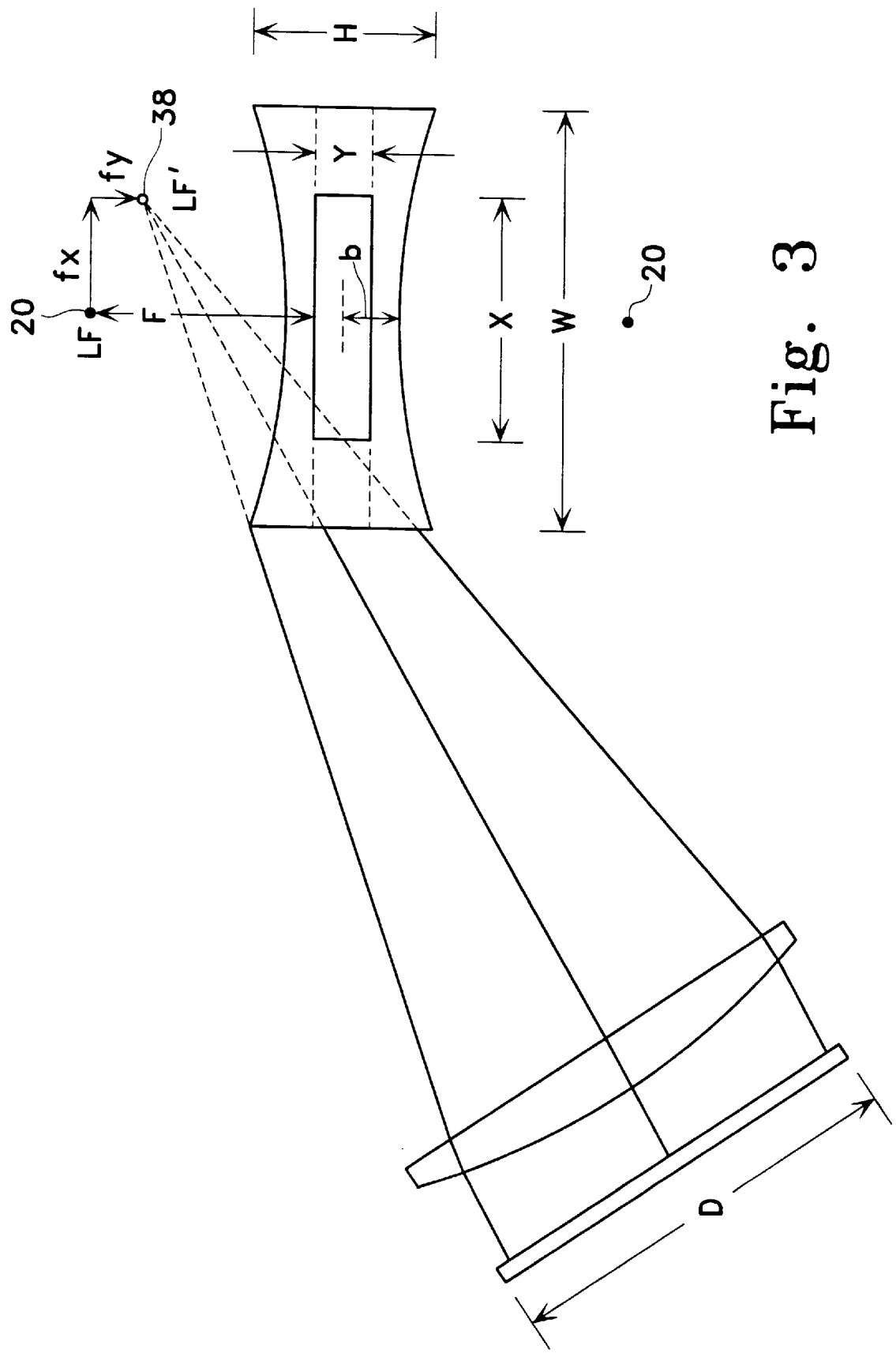
FIG. 3 is a plan view simplified schematic illustration of the slab laser pump cavity apparatus with an integral concentrator of FIG. 1 in which the line focus of the diode pump is offset from the line foci of the hyperbolic cylindrical focusing surfaces, showing the design parameters.

FIG. 3 is a plan view simplified schematic illustration of the slab laser pump cavity apparatus with an integral concentrator of FIG. 1, showing the design parameters. The specific geometry of a representative embodiment of the slab laser pump cavity 10, used in computer simulation, is described by the parameters defined in the following table.

| TABLE OF GEOMETRIC DIMENSIONS | |
| --- | --- |
| Laser Pump Cavity Width | W = 17 cm |
| Laser Pump Cavity Entrance Height | H = 3.5 cm |
| Active Region (Slab) Width | X = 10 cm |
| Active Region (Slab) Height | Y = 1 cm |
| Base Radius of Curvature | r = 21.75 cm |
| Conic Constant | k = −30.0 cm |
| Vertex | b = 0.75 cm |
| Focal Distance | F = 3.358 cm |
| Absorption Coefficient | a = 0.3 cm$^{-1}$ |
| Laser Diode Array Size | D = 20 cm |
| Cylindrical Len Focal Length (Air) for Paraxial Rays | f1 = 60 um |
| Diode Pump Axis X Offset | $f_x$ = +2.0 cm |
| Diode Pump Axis Y Offset | $f_y$ = −0.55 cm |

Figure 4:
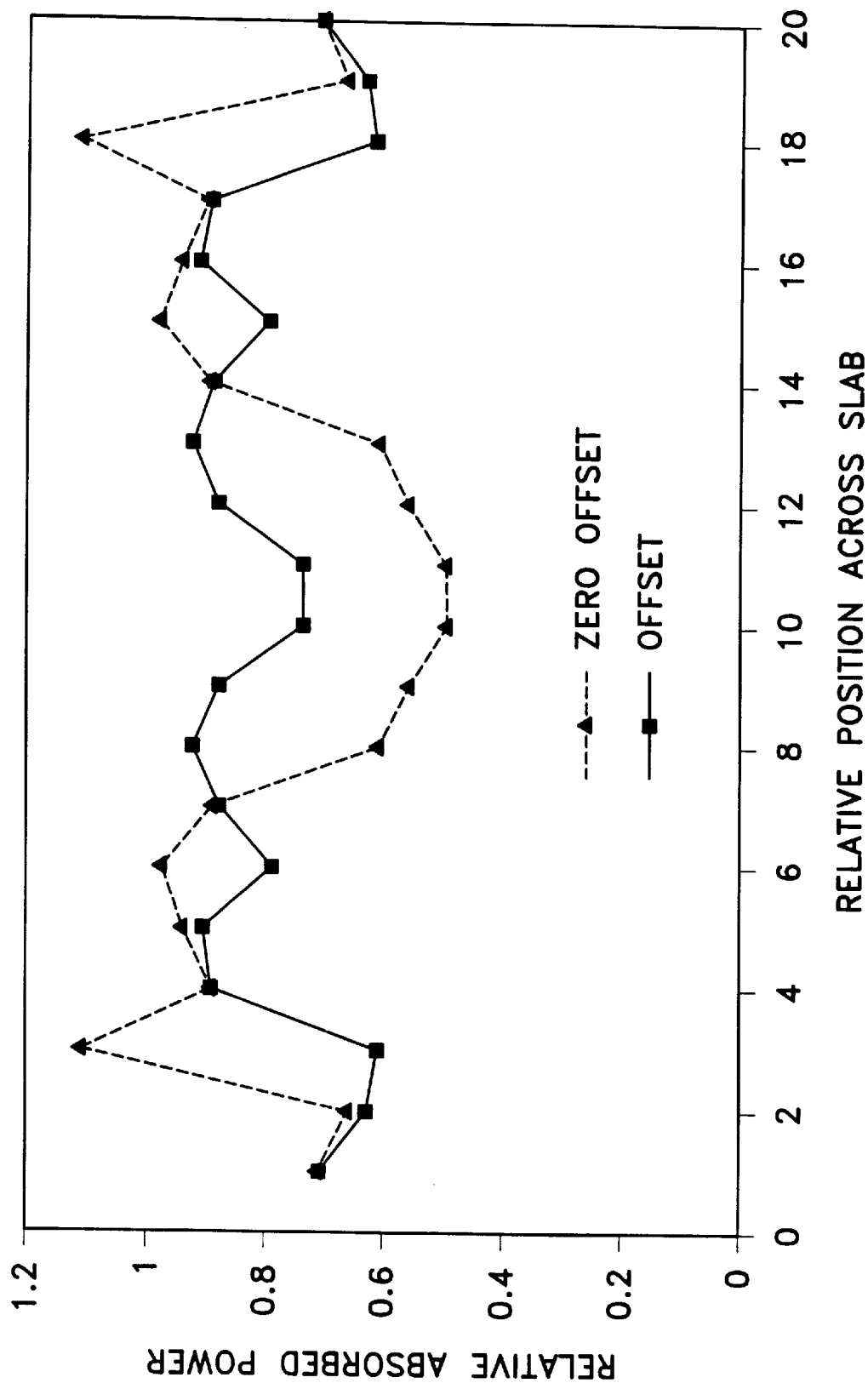
FIG. 4 is a diagram showing absorbed power profile, with and without an offset, versus relative absorbed power.

The calculated absorption efficiency for this embodiment of the slab laser pump cavity 10 is 93% and the rms variation in the absorbed power profile, defining uniformity, is 14% of the mean value. FIG. 4 is a diagram showing absorbed power profile, with and without an offset, versus relative absorbed power. In FIG. 4 the absorbed power profile obtained for the embodiment with undershooting line foci of cylindrical focusing surface 20, as defined in the Table of Geometric Dimensions, is represented with square data points. The case where the pumplight is focused at the line foci of cylindrical focusing surface 20 and has a zero offset, i.e., $f_x$=0 and $f_y$=0, is represented with triangular data points. FIG. 4, therefore, shows the advantage of offsetting the focus of the pumplight with respect to the line foci of the cylindrical focusing surfaces 20. The rms variation in the absorbed power profile for the case with zero offset is 26% of the mean value, which is significantly worse than in the case with a non-zero offset. The geometry for the non-zero offset case has not been fully optimized. However, it is believed that even higher uniformity and absorption efficiency are achievable with further optimization, performed in accordance with the above-defined design rules.

The apparatus and method aspects of the present invention which use the integrating laser pump cavity concept with improved gain uniformity and efficiency of the slab laser pumphead are believed to be applicable to the types of integrating laser pump cavity devices with an integral concentrator such as are used in high power solid-state laser products for industrial and military applications.

While this invention has been described with reference to its presently preferred embodiment(s), its scope is only limited insofar as defined by the following set of claims and all equivalents thereof.

What is claimed is:

1. A laser pump cavity apparatus with integral concentrator, comprising:

a doped solid-state lasing medium providing an active lasing region having a top surface, a bottom surface and at least two edge surfaces, surrounding a laser beam axis; and a concentrator comprising:
a top cladding layer formed on the top surface of the active lasing region and having a first concave cylindrical outer focusing surface, and
a bottom cladding layer formed on the bottom surface of the active lasing region and having a second concave cylindrical outer focusing surface, wherein
said first concave cylindrical outer focusing surface defines a first optical line focus located parallel to the laser beam axis and above said first surface, and
said second concave cylindrical outer focusing surface defines a second optical line focus located parallel to the laser beam axis and below said second surface.

2. The laser pump cavity apparatus of claim 1, wherein said first and second concave cylindrical outer focusing surfaces have a hyperbolic cylindrical shape.

3. The laser pump cavity apparatus of claim 1, wherein said first and second concave cylindrical outer focusing surfaces have a quasi-hyperbolic cylindrical shape.

4. The laser pump cavity apparatus of claim 1, wherein:
said first and second concave cylindrical outer focusing surfaces are coated to ensure high reflectivity at the pump wavelength.

5. The laser pump cavity apparatus of claim 1, further comprising:
a pair of edge cladding layers formed on the two edge surfaces of the active lasing region.

6. The laser pump cavity apparatus of claim 1, further comprising
a plurality of laser diode arrays for edge-pumping the lasing medium in directions transverse to the laser beam axis.

7. The laser pump cavity apparatus of claim 6, wherein
an entrance surface of the laser pump cavity apparatus formed by respective edge surfaces of the lasing medium, the top cladding layer and the bottom cladding layer, is coated with a material which has antireflection properties at a pump wavelength for a predetermined range of incidence angles, to maximize transmission of pumplight from at least one of the laser diode arrays into the laser pump cavity apparatus.

8. The laser pump cavity apparatus of claim 7, wherein
each said entrance surface comprises two touching, slanted planes, each providing a low angle of incidence to pumplight from an adjacent one of said laser diode arrays.

9. The laser pump cavity apparatus of claim 6, wherein:
the line focus of each said laser diode array is placed in a region of the laser pump cavity apparatus located between the concave cylindrical outer focusing surface corresponding to said laser diode array and the line focus of the concave cylindrical outer focusing surface, and
absorbed pumplight is distributed toward a center of the laser pump cavity apparatus by undershooting the line foci.

10. The laser pump cavity apparatus of claim 6, wherein:
each said laser diode array has integral cylindrical microlenses means and a cylindrical lens or lens group,
the integral cylindrical microlenses means forms a collimated pumplight from each said laser diode array in a predetermined direction,
the cylindrical lens or lens group, focuses the collimated pumplight from each said laser diode array to be refracted at the corresponding entrance surface of the laser pump cavity apparatus, and focused by the line foci of said first and second concave cylindrical outer focusing surfaces to form a focused pumplight, and
the focused pumplight at one of the line foci is reflected by the non-corresponding concave cylindrical outer focusing surface toward the other line focus, and this reflecting process is repeated with each of said first and second concave cylindrical outer focusing surfaces, thus trapping the pumplight between the two focusing surfaces until it is substantially absorbed.

11. The laser pump cavity apparatus of claim 1, further comprising:
an upper cold plate having a bottom surface in thermal contact with the first concave cylindrical outer focusing surface,
a lower cold plate having an upper surface in thermal contact with the second concave cylindrical outer focusing surface.

12. The laser pump cavity apparatus of claim 11, wherein
extraction of heat from the doped laser crystal is by conduction through the concentrator and through the first and second concave cylindrical outer focusing surfaces to the cold plates,
the cold plates are made of an aluminum alloy, and
thermal interfaces made of metal foil are placed between the cold plates and the concave cylindrical outer focusing surfaces.

13. The laser pump cavity apparatus of claim 1, wherein:
the doped solid-state laser medium is made of high-aspect ratio slab,
the doping of the active lasing region is performed with an active ion, and
said concentrator is manufactured by a diffusion bonding process in which undoped solid-state medium is diffusion bonded to the top, bottom and edge surfaces of the active lasing region.

* * * * *